(12) United States Patent
Bi et al.

(10) Patent No.: US 10,455,606 B2
(45) Date of Patent: Oct. 22, 2019

(54) SPATIAL FLOW DETERMINING METHOD, BASE STATION, AND USER EQUIPMENT

(71) Applicant: Huawei Technologies Co., Ltd., Shenzhen (CN)

(72) Inventors: Xiaoyan Bi, Shanghai (CN); Dageng Chen, Shanghai (CN); Hejia Luo, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 244 days.

(21) Appl. No.: 15/295,653

(22) Filed: Oct. 17, 2016

(65) Prior Publication Data

US 2017/0034848 A1 Feb. 2, 2017

Related U.S. Application Data

(63) Continuation of application No. PCT/CN2014/075701, filed on Apr. 18, 2014.

(51) Int. Cl.
*H04W 72/12* (2009.01)
*H04W 72/02* (2009.01)
(Continued)

(52) U.S. Cl.
CPC ...... *H04W 72/1289* (2013.01); *H04B 7/0417* (2013.01); *H04B 7/0486* (2013.01); *H04B 7/0632* (2013.01); *H04W 24/10* (2013.01); *H04W 40/02* (2013.01); *H04W 72/02* (2013.01); *H04B 7/0697* (2013.01)

(58) Field of Classification Search
CPC .......... H04W 72/1289; H04W 72/0413; H04B 7/0417; H04B 7/0486; H04B 7/0632
See application file for complete search history.

(56) References Cited

U.S. PATENT DOCUMENTS

2007/0242770 A1 10/2007 Kim et al.
2008/0260051 A1 10/2008 Boccardi et al.
(Continued)

FOREIGN PATENT DOCUMENTS

| CN | 1805304 A | 7/2006 |
|---|---|---|
| CN | 101411110 A | 4/2009 |

(Continued)

OTHER PUBLICATIONS

Fujitsu, "Consideration regarding additional information for new aperiodic PUSCH feedback mode," 3GPP TSG-RAN WG1 Meeting #72bis, R1-131095, Chicago, IL, USA, Apr. 15-19, 2013, 3 pages.

*Primary Examiner* — Anez C Ebrahim
(74) *Attorney, Agent, or Firm* — Slater Matsil, LLP

(57) ABSTRACT

Embodiments provide a spatial flow determining method, a base station, and user equipment. The method includes sending, by a base station, a feedback mode indication to user equipment, where the feedback mode indication is used to instruct the user equipment to feed back, based on a packet granularity, channel state report (CSR) information, and each packet granularity includes at least one spatial flow. The method also includes receiving, by the base station, CSR information of each packet granularity that is sent by the user equipment; and determining, by the base station according to the CSR information of each packet granularity, a spatial flow used to transmit data to the user equipment.

16 Claims, 7 Drawing Sheets

(51) Int. Cl.
*H04W 24/10* (2009.01)
*H04W 40/02* (2009.01)
*H04B 7/0417* (2017.01)
*H04B 7/0456* (2017.01)
*H04B 7/06* (2006.01)

(56) References Cited

U.S. PATENT DOCUMENTS

| | | |
|---|---|---|
| 2011/0211662 A1 | 9/2011 | Varadarajan et al. |
| 2011/0244847 A1* | 10/2011 | Mallik .................. H04B 7/024 |
| | | 455/422.1 |
| 2011/0299626 A1 | 12/2011 | Kim et al. |
| 2012/0051408 A1 | 3/2012 | Van Zelst et al. |
| 2012/0076028 A1 | 3/2012 | Ko et al. |
| 2012/0329502 A1* | 12/2012 | Frederiksen .......... H04L 1/0026 |
| | | 455/509 |
| 2013/0148600 A1 | 6/2013 | Moulsley et al. |
| 2014/0078982 A1* | 3/2014 | Nammi ................ H04B 7/0473 |
| | | 370/329 |
| 2015/0312871 A1* | 10/2015 | Tong ................. H04W 56/0045 |
| | | 370/252 |

FOREIGN PATENT DOCUMENTS

| | | |
|---|---|---|
| CN | 102045096 A | 5/2011 |
| CN | 103081371 A | 5/2013 |
| JP | 2009531993 A | 9/2009 |
| JP | 2013539312 A | 10/2013 |
| WO | 2007112371 A1 | 10/2007 |

\* cited by examiner

SPATIAL FLOW DETERMINING METHOD, BASE STATION, AND USER EQUIPMENT

CROSS-REFERENCE TO RELATED APPLICATIONS

This application is a continuation of International Application No. PCT/CN2014/075701, filed on Apr. 18, 2014, the disclosure of which is hereby incorporated by reference in its entirety.

TECHNICAL FIELD

The present invention relates to the field of wireless communications technologies, and in particular, to a spatial flow determining method, a base station, and user equipment.

BACKGROUND

In a 3rd Generation Partnership Project Long Term Evolution (LTE for short) system, user equipment feeds back obtained channel state information (CSI for short) of a downlink channel to a base station, and the base station selects an appropriate communications data modulation and coding scheme, a data transmission speed, and a transmission subband for the user equipment according to the channel state information that is fed back. A multi-user multiple-input multiple-output (MU-MIMO for short) communications manner is introduced to LTE R10, that is, a multi-antenna mechanism is introduced to an user equipment end, and multiple user equipments communicate simultaneously. In this mechanism, a quantity of antennas at an evolved NodeB (eNodeB for short) end is relatively large. By introducing multiple antennas to the user equipment end, single user equipment may establish multiple data streams with an eNodeB, thereby bringing a higher spatial multiplexing gain.

In the prior art, user equipment feeds back channel state report (CSR for short) information to a base station based on a code word granularity, that is, feeds back, to the base station, overall channel quality information of a spatial flow included in each code word for information transmission between the user equipment and the base station, and the base station schedules a downlink resource according to a status of overall channel quality of the spatial flow in each code word; however, the method may cause improper spatial flow scheduling that is performed by the base station, thereby resulting in a waste of system resources.

SUMMARY

Embodiments provide a spatial flow determining method, a base station, and user equipment, so as to resolve a problem that system resources are wasted due to improper spatial flow scheduling.

A first aspect of the embodiments provides a spatial flow determining method. The method includes sending, by a base station, a feedback mode indication to user equipment, where the feedback mode indication is used to instruct the user equipment to feed back, based on a packet granularity, channel state report CSR information, and each packet granularity includes at least one spatial flow, receiving, by the base station, CSR information of each packet granularity that is sent by the user equipment. The method also includes determining, by the base station according to the CSR information of each packet granularity, a spatial flow used to transmit data to the user equipment.

In a first possible implementation manner of the first aspect, before the receiving, by the base station, CSR information of each packet granularity that is sent by the user equipment, the method further includes sending, by the base station, configuration information to the user equipment, where the configuration information includes at least one of the following parameters: a quantity of spatial flows included in each packet granularity, a time-frequency resource occupied by the CSR information, and feedback manner information of CSR information of different packet granularities.

With reference to the first aspect or the first possible implementation manner of the first aspect, in a second possible implementation manner of the first aspect, the CSR information of each packet granularity includes: information about an average value of channel quality of spatial flows in each packet granularity, and information about a difference between the channel quality of each spatial flow and the average value.

With reference to the first aspect or the first possible implementation manner of the first aspect, in a third possible implementation manner of the first aspect, the CSR information of each packet granularity includes: channel quality information of each spatial flow in each packet granularity; and after the receiving, by the base station, the CSR information of each packet granularity that is sent by the user equipment, the method further includes: determining, by the base station, information about an average value of channel quality of spatial flows in each packet granularity, and information about a difference between the channel quality of each spatial flow and the average value according to the channel quality information of each spatial flow in each packet granularity.

With reference to any one of the first aspect and the first to third possible implementation manners of the first aspect, in a fourth possible implementation manner of the first aspect, the quantity of spatial flows included in each packet granularity is less than a quantity of spatial flows included in each code word.

A second aspect of the embodiments provides a spatial flow determining method. The method includes receiving, by user equipment, a feedback mode indication sent by a base station, where the feedback mode indication is used to instruct the user equipment to feed back, based on a packet granularity, channel state report CSR information, and each packet granularity includes at least one spatial flow. The method also includes measuring, by the user equipment, channel quality information of each spatial flow, and obtaining CSR information of each packet granularity according to the channel quality information. The method also includes sending, by the user equipment, the CSR information of each packet granularity to the base station according to the feedback mode indication.

In a first possible implementation manner of the second aspect, before the measuring, by the user equipment, channel quality information of each spatial flow, the method further includes receiving, by the user equipment, configuration information sent by the base station, where the configuration information includes at least one of the following parameters: a quantity of spatial flows included in each packet granularity, a time-frequency resource occupied by the CSR information, and feedback manner information of CSRs of different packet granularities.

With reference to the second aspect or the first possible implementation manner of the second aspect, in a second possible implementation manner of the second aspect, the CSR information of each packet granularity includes: information about an average value of channel quality of spatial flows in each packet granularity, and information about a difference between the channel quality of each spatial flow and the average value; or the CSR information of each packet granularity includes: channel quality information of each spatial flow in each packet granularity.

With reference to any one of the second aspect and the first to second possible implementation manners of the second aspect, in a third possible implementation manner of the second aspect, the quantity of spatial flows included in each packet granularity is less than a quantity of spatial flows included in each code word.

A third aspect of the embodiments provides a base station. The base station includes a first sending module, configured to send a feedback mode indication to user equipment, where the feedback mode indication is used to instruct the user equipment to feed back, based on a packet granularity, channel state report CSR information, and each packet granularity includes at least one spatial flow. The base station also includes a receiving module, configured to receive CSR information of each packet granularity that is sent by the user equipment. The base station also includes a first determining module, configured to determine, according to the CSR information of each packet granularity, a spatial flow used to transmit data to the user equipment.

In a first possible implementation manner of the third aspect, the base station further includes a second sending module, configured to: before the receiving module receives the CSR information of each packet granularity that is sent by the user equipment, send configuration information to the user equipment, where the configuration information includes at least one of the following parameters: a quantity of spatial flows included in each packet granularity, a time-frequency resource occupied by the CSR information, and feedback manner information of CSR information of different packet granularities.

With reference to the third aspect or the first possible implementation manner of the third aspect, in a second possible implementation manner of the third aspect, the CSR information of each packet granularity includes: information about an average value of channel quality of spatial flows in each packet granularity, and information about a difference between the channel quality of each spatial flow and the average value.

With reference to the third aspect or the first possible implementation manner of the third aspect, in a third possible implementation manner of the third aspect, the base station further includes a second determining module. The CSR information of each packet granularity includes: channel quality information of each spatial flow in each packet granularity. The second determining module is configured to: after the receiving module receives the CSR information of each packet granularity that is sent by the user equipment, determine information about an average value of channel quality of spatial flows in each packet granularity, and information about a difference between the channel quality of each spatial flow and the average value according to the channel quality information of each spatial flow in each packet granularity.

With reference to any one of the third aspect and the first to third possible implementation manners of the third aspect, in a fourth possible implementation manner of the third aspect, the quantity of spatial flows included in each packet granularity is less than a quantity of spatial flows included in each code word.

A fourth aspect of the embodiments provides user equipment. The user equipment includes a first receiving module, configured to receive a feedback mode indication sent by a base station, where the feedback mode indication is used to instruct the user equipment to feed back, based on a packet granularity, channel state report CSR information, and each packet granularity includes at least one spatial flow. The user equipment also includes a measuring module, configured to measure channel quality information of each spatial flow, and obtain CSR information of each packet granularity according to the channel quality information. The user equipment also includes a sending module, configured to send the CSR information of each packet granularity to the base station according to the feedback mode indication received by the receiving module.

In a first possible implementation manner of the fourth aspect, the user equipment further includes a second receiving module, configured to: before the measuring module measures the channel quality information of each spatial flow, receive configuration information sent by the base station, where the configuration information includes at least one of the following parameters: a quantity of spatial flows included in each packet granularity, a time-frequency resource occupied by the CSR information, and feedback manner information of CSR information of different packet granularities.

With reference to the fourth aspect or the first possible implementation manner of the fourth aspect, in a second possible implementation manner of the fourth aspect, the CSR information of each packet granularity includes: information about an average value of channel quality of spatial flows in each packet granularity, and information about a difference between the channel quality of each spatial flow and the average value; or the CSR information of each packet granularity includes: channel quality information of each spatial flow in each packet granularity.

With reference to any one of the fourth aspect and the first to second possible implementation manners of the fourth aspect, in a third possible implementation manner of the fourth aspect, the quantity of spatial flows included in each packet granularity is less than a quantity of spatial flows included in each code word.

A fifth aspect of embodiments provides a base station. The base station includes a transmitter, configured to send a feedback mode indication to user equipment, where the feedback mode indication is used to instruct the user equipment to feed back, based on a packet granularity, channel state report CSR information, and each packet granularity includes at least one spatial flow. The base station also includes a receiver, configured to receive CSR information of each packet granularity that is sent by the user equipment. The base station also includes a processor, configured to determine, according to the CSR information of each packet granularity, a spatial flow used to transmit data to the user equipment.

In a first possible implementation manner of the fifth aspect, the transmitter is further configured to: before the receiver receives the CSR information of each packet granularity that is sent by the user equipment, send configuration information to the user equipment, where the configuration information includes at least one of the following parameters: a quantity of spatial flows included in each packet granularity, a time-frequency resource occupied by the CSR information, and feedback manner information of CSR information of different packet granularities.

With reference to the fifth aspect or the first possible implementation manner of the fifth aspect, in a second possible implementation manner of the fifth aspect, the CSR information of each packet granularity includes: information about an average value of channel quality of spatial flows in each packet granularity, and information about a difference between the channel quality of each spatial flow and the average value.

With reference to the fifth aspect or the first possible implementation manner of the fifth aspect, in a third possible implementation manner of the fifth aspect, the CSR information of each packet granularity includes: channel quality information of each spatial flow in each packet granularity. The processor is further configured to: after the receiver receives the CSR information of each packet granularity that is sent by the user equipment, determine information about an average value of channel quality of spatial flows in each packet granularity, and information about a difference between the channel quality of each spatial flow and the average value according to the channel quality information of each spatial flow in each packet granularity.

With reference any one of the fifth aspect and the first to third possible implementation manners of the fifth aspect, in a fourth possible implementation manner of the fifth aspect, the quantity of spatial flows included in each packet granularity is less than a quantity of spatial flows included in each code word.

A sixth aspect of the embodiments provides user equipment. The user equipment includes a receiver, configured to receive a feedback mode indication sent by a base station, where the feedback mode indication is used to instruct the user equipment to feed back, based on a packet granularity, channel state report CSR information, and each packet granularity includes at least one spatial flow. The user equipment also includes a processor, configured to measure channel quality information of each spatial flow, and obtain CSR information of each packet granularity according to the channel quality information. The user equipment also includes a transmitter, configured to send the CSR information of each packet granularity to the base station according to the feedback mode indication received by the receiver.

In a first possible implementation manner of the sixth aspect, the receiver is further configured to: before the processor measures the channel quality information of each spatial flow, receive configuration information sent by the base station, where the configuration information includes at least one of the following parameters: a quantity of spatial flows included in each packet granularity, a time-frequency resource occupied by the CSR information, and feedback manner information of CSR information of different packet granularities.

With reference to the sixth aspect or the first possible implementation manner of the sixth aspect, in a second possible implementation manner of the sixth aspect, the CSR information of each packet granularity includes: information about an average value of channel quality of spatial flows in each packet granularity, and information about a difference between the channel quality of each spatial flow and the average value; or the CSR information of each packet granularity includes: channel quality information of each spatial flow in each packet granularity.

With reference to any one of the sixth aspect and the first to second possible implementation manners of the sixth aspect, in a third possible implementation manner of the sixth aspect, the quantity of spatial flows included in each packet granularity is less than a quantity of spatial flows included in each code word.

In the spatial flow determining method provided by embodiments, a base station sends a feedback mode indication to user equipment, where the feedback mode indication is used to instruct the user equipment to feed back, based on a packet granularity, channel state report CSR information, and each packet granularity includes at least one spatial flow, and then receives channel state report CSR information of each packet granularity that is sent by the user equipment, and finally, the base station can determine, according to the CSR information of each packet granularity, a spatial flow used to transmit data to the user equipment. Because the user equipment uses at least one spatial flow as a packet granularity to report the CSR information, the CSR information is more accurate, thereby improving properness of selecting, by the base station for a user, a spatial flow used to transmit data, and improving utilization of system resources.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

Figure 1:
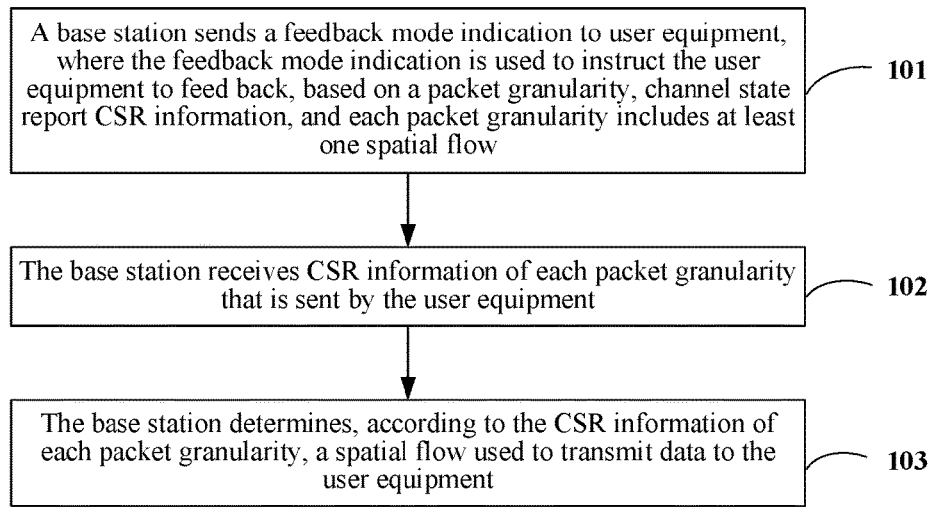
FIG. 1 is a flowchart of a spatial flow determining method according to an embodiment.

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Technologies described in this specification may be applied to various communications systems, for example, current 2G and 3G communications systems and a next-generation communications system, for example, a Global System for Mobile Communications (GSM for short), a Code Division Multiple Access (CDMA for short) system, a Time Division Multiple Access (TDMA for short) system, a Wideband Code Division Multiple Access (WCDMA for short) system, a Frequency Division Multiple Access (FDMA for short) system, an Orthogonal Frequency-Division Multiple Access (OFDMA for short) system, a single-carrier FDMA (SC-FDMA) system, a General Packet Radio Service (GPRS for short) system, a Long Term Evolution (LTE for short) system, and other communications systems.

User equipment in this application may be wireless user equipment or wired user equipment. The wireless user equipment may refer to equipment that provides a user with voice and/or data connectivity, a handheld device with a radio connection function, or another processing device connected to a radio modem. The wireless user equipment may communicate with one or more core networks by using a radio access network (RAN for short). The wireless user equipment may be mobile user equipment, such as a mobile phone (also referred to as a "cellular" phone) and a computer with mobile user equipment, for example, may be a portable, pocket-sized, handheld, computer built-in, or in-vehicle mobile apparatus, which exchanges voice and/or data with the radio access network. For example, it may be a device such as a personal communication service (PCS for short) phone, a cordless telephone set, a Session Initiation Protocol (SIP) phone, a wireless local loop (WLL for short) station, or a personal digital assistant (PDA for short). The wireless user equipment may also be referred to as a system, a subscriber unit, a subscriber station, a mobile station, a mobile terminal (Mobile), a remote station, an access point, a remote user equipment (Remote Terminal), an access user equipment (Access Terminal), a user terminal, a user agent, a user device, or user equipment.

A base station involved in this application may be a base station (BTS for short) in CDMA, or may be a base station NodeB in WCDMA, or may be an evolved NodeB (eNB or eNodeB for short) in LTE, which is not limited in the present invention; however, for ease of description, the following embodiment uses a NodeB as an example for description.

FIG. 1 is a flowchart of a spatial flow determining method according to an embodiment. As shown in FIG. 1, the method in this embodiment may include the following steps.

Step 101: A base station sends a feedback mode indication to user equipment, where the feedback mode indication is used to instruct the user equipment to feed back, based on a packet granularity, channel state report CSR information, and each packet granularity includes at least one spatial flow.

Specifically, a feedback mode indication sent by the base station to user equipment in a cell is based on a packet granularity, and each packet granularity includes at least one spatial flow, so that the user equipment feeds back channel information according to a packet granularity of a spatial flow.

Step 102: The base station receives CSR information of each packet granularity that is sent by the user equipment.

In an embodiment, specifically, the CSR information of each packet granularity includes: information about an average value of channel quality of spatial flows in each packet granularity, and information about a difference between the channel quality of each spatial flow and the average value. After acquiring channel quality information of each spatial flow, the user equipment may generate the information about the average value of the channel quality of the spatial flows, and the information about the difference between the channel quality of each spatial flow and the average value according to the channel quality information and report the information to the base station.

In another embodiment, the base station receives the CSR information sent by the user equipment, where the CSR information includes channel quality information of each spatial flow in each packet granularity, and the base station may obtain through calculation, according to the channel quality information of each spatial flow in each packet granularity, information about an average value of channel quality of the spatial flows, and information about a difference between the channel quality of each spatial flow and the average value.

Optionally, before receiving the CSR information of each packet granularity that is sent by the user equipment, the base station may further send configuration information to the user equipment, where the configuration information includes at least one of the following parameters: a quantity of spatial flows included in each packet granularity, a time-frequency resource occupied by the CSR information, and feedback manner information of CSR information of different packet granularities.

For example, 20 spatial flows that can transmit data exist between the user equipment and the base station, when each packet granularity includes one spatial flow, specifically, the user equipment collects channel quality information of each spatial flow, that is, collects channel quality information of 20 spatial flows, then obtains a set of CSR information according to the channel quality information by using one spatial flow as one group, that is, generates 20 sets of CSR information, and then feeds back the 20 sets of CSR information to the base station, and in this case, the base station receives the 20 sets of CSR information. When each packet granularity includes two spatial flows, specifically, the user equipment also collects the channel quality information of each spatial flow, that is, collects the channel quality information of the 20 spatial flows, then obtains a set of CSR information according to the channel quality information by using two spatial flows as one group, that is, generates 10 sets of CSR information, and then feeds back the 10 sets of CSR information to the base station, and in this case, the base station receives the 10 sets of CSR information.

Further, the quantity of spatial flows included in each packet granularity is configured by the base station according to a real-time situation of a channel. When a transmission speed of the channel is stable and signal quality is relatively strong, the quantity of spatial flows included in each packet granularity may be as less as possible, that is, the CSR information sent by a user to the base station is more accurate, for example, each packet granularity may include one spatial flow; however, when the transmission speed of the channel is not stable and the signal quality is relatively weak, the quantity of spatial flows included in each packet granularity may be appropriately increased, for example, each packet granularity may include two spatial flows or three spatial flows. However, the quantity of spatial flows included in each packet granularity is less than a quantity of spatial flows included in each code word. Optionally, the quantity of spatial flows included in each packet granularity is less than the quantity of spatial flows included in each code word. Feedback manners of the CSR information of different packet granularities may be a periodic feedback manner or a non-periodic feedback manner, where the periodic feedback manner and the non-periodic feedback manner further include reporting an overall bandwidth, or selecting and reporting a best part of a bandwidth by the user equipment.

Step 103: The base station determines, according to the CSR information of each packet granularity, a spatial flow used to transmit data to the user equipment.

Specifically, after receiving the CSR information sent by the user equipment, the base station predicts, according to the information about the average value of the channel quality of the spatial flows in each packet granularity, and the information about the difference between the channel quality of each spatial flow and the average value in the CSR information, a data transmission speed of a spatial flow included in each packet granularity, and then calculates, according to the predicted data transmission speed and by comprehensively considering a performance requirement of a system, for example, balance between spatial flows for transmitting data to user equipments, performance weights of the spatial flows included in each packet granularity, so that a group of spatial flows with best performance are selected to perform data transmission, that is, a spatial flow with a maximum weight is selected to perform data transmission; or spatial flows may also be selected in a balanced manner according to the information about the average value of the channel quality of the spatial flows in each packet granularity, and the information about the difference between the channel quality of each spatial flow and the average value, so that utilization of a spatial flow is improved.

Optionally, the base station attempts to select mutually orthogonal spatial flows according to the CSR information of each packet granularity.

For example, a cell has 10 user equipments, and each user equipment establishes 20 spatial flows with an eNodeB. In embodiments of the present invention, the base station acquires CSR information of total 200 spatial flows uploaded by the user equipments, so that the base station may select, according to CSR information of all spatial flows of each user equipment, spatial flows with good quality to perform data transmission, and orthogonality between the selected spatial flows is highest; therefore, the base station may select 10 spatial flows with relatively good channel quality from first user equipment, five spatial flows with relatively good channel quality from second user equipment, and the like, and the selected spatial flows may be separated from each other or may be next to each other, as long as channel quality is relatively good and orthogonality between two spatial flows is highest. Because the orthogonality between the selected spatial flows is highest, inter-layer interference at a user equipment end is relatively easy to be eliminated.

In the spatial flow determining method provided by this embodiment, a base station sends a feedback mode indication to user equipment, where the feedback mode indication is used to instruct the user equipment to feed back, based on a packet granularity, channel state report CSR information, and each packet granularity includes at least one spatial flow, and then receives CSR information of each packet granularity that is sent by the user equipment, and the base station can determine, according to the CSR information of each packet granularity, a spatial flow used to transmit data to the user equipment. Because the user equipment uses at least one spatial flow as a packet granularity to report the CSR information, the CSR information is more accurate, thereby improving properness of selecting, by the base station for a user, a spatial flow used to transmit data, and further improving utilization of system resources.

Figure 2:
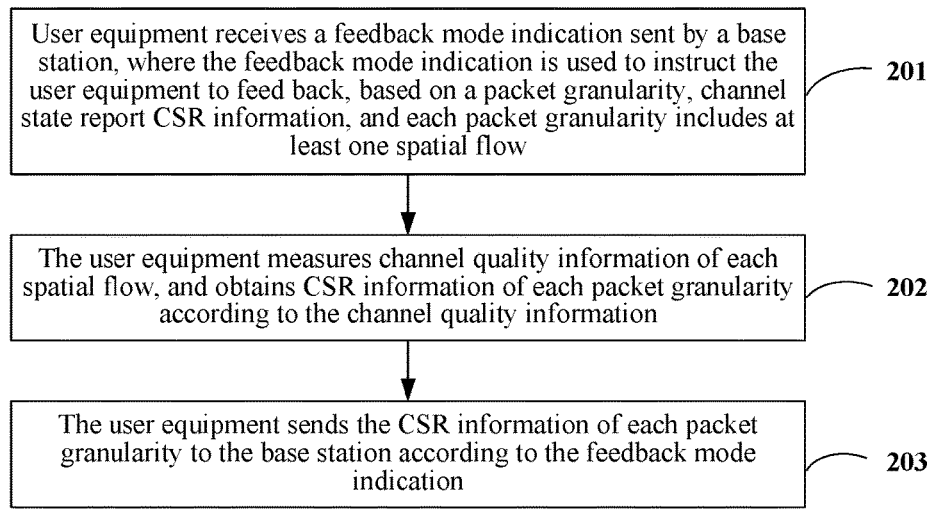
FIG. 2 is a flowchart of a spatial flow determining method according to another embodiment.

FIG. 2 is a flowchart of a spatial flow determining method according to another embodiment of the present invention. As shown in FIG. 2, the method in this embodiment may include the following steps.

Step 201: User equipment receives a feedback mode indication sent by a base station, where the feedback mode indication is used to instruct the user equipment to feed back, based on a packet granularity, channel state report CSR information, and each packet granularity includes at least one spatial flow.

Specifically, the user equipment receives the feedback mode indication sent by the base station, and the user equipment feeds back the CSR information according to the feedback mode indication, and each packet granularity includes at least one spatial flow.

Step 202: The user equipment measures channel quality information of each spatial flow, and obtains CSR information of each packet granularity according to the channel quality information.

Optionally, before the user equipment measures the channel quality information of each spatial flow, the user equipment receives a configuration message sent by the base station, where the configuration message includes at least one of the following parameters: a quantity of spatial flows included in each packet granularity, a time-frequency resource occupied by the CSR information, and feedback manner information of CSR information of different packet granularities.

For example, 20 spatial flows that can transmit data exist between the user equipment and the base station, when each packet granularity includes one spatial flow, specifically, the user equipment collects channel quality information of each spatial flow, that is, collects channel quality information of 20 spatial flows, then obtains a set of CSR information according to the channel quality information by using one spatial flow as one group, that is, generates 20 sets of CSR information, and then feeds back the 20 sets of CSR information to the base station, and in this case, the base station receives the 20 sets of CSR information. When each packet granularity includes two spatial flows, specifically, the user equipment also collects the channel quality information of each spatial flow, that is, collects the channel quality information of the 20 spatial flows, then obtains a set of CSR information according to the channel quality information by using two spatial flows as one group, that is, generates 10 sets of CSR information, and then feeds back the 10 sets of CSR information to the base station, and in this case, the base station receives the 10 sets of CSR information.

The quantity of spatial flows included in each packet granularity is configured by the base station according to a real-time situation of a channel. When a transmission speed of the channel is stable and signal quality is relatively strong, the quantity of spatial flows included in each packet granularity may be as less as possible, that is, the CSR information sent to the base station is more accurate, for example, each packet granularity may include one spatial flow; however, when the transmission speed of the channel is not stable and the signal quality is relatively weak, the quantity of spatial flows included in each packet granularity may be appropriately increased, for example, each packet granularity may include two spatial flows or three spatial flows. However, the quantity of spatial flows included in each packet granularity is less than a quantity of spatial flows included in each code word.

In an embodiment, after measuring the channel quality information of each spatial flow according to the feedback mode indication and the configuration information, the user equipment analyzes the channel quality information of each spatial flow to obtain information about an average value of channel quality of spatial flows in each packet granularity, and information about a difference between the channel quality of each spatial flow and the average value, and then sends the information as the CSR information to the base station, so that the base station may directly determine, for the user equipment according to the information, a spatial flow used to transmit data.

In another embodiment, after measuring the channel quality information of each spatial flow according to the feedback mode indication and the configuration information, the user equipment sends the channel quality information as the CSR information to the base station, so that the base station obtains through analysis information about an average value of channel quality of spatial flows in each packet granularity, and information about a difference between the channel quality of each spatial flow and the average value according to the channel quality information, and then the base station determines, for the user equipment according to the information about the average value of the channel quality of the spatial flows in each packet granularity, and the information about the difference between the channel quality of each spatial flow and the average value that are obtained through analysis, a spatial flow used to transmit data.

Feedback manners of the CSR information of different packet granularities may be a periodic feedback manner or a non-periodic feedback manner, where the periodic feedback manner and the non-periodic feedback manner further include reporting an overall bandwidth, or selecting and reporting a best part of a bandwidth by the user equipment.

Step 203: The user equipment sends the CSR information of each packet granularity to the base station according to the feedback mode indication.

In an embodiment, after measuring the channel quality information of each spatial flow according to the feedback mode indication and the configuration information, the user equipment analyzes the channel quality information of each spatial flow to obtain information about an average value of channel quality of spatial flows in each packet granularity, and information about a difference between the channel quality of each spatial flow and the average value, and then sends the information as the CSR information to the base station.

In another embodiment, after measuring the channel quality information of each spatial flow according to the feedback mode indication and the configuration information, the user equipment sends the channel quality information as the CSR information to the base station.

In the spatial flow determining method provided by this embodiment, user equipment receives a feedback mode indication sent by a base station, where the feedback mode indication is used to instruct the user equipment to feed back, based on a packet granularity, channel state report CSR information, and each packet granularity includes at least one spatial flow, and then the user equipment measures channel quality information of each spatial flow, and obtains CSR information of each packet granularity according to the channel quality information, and finally sends the CSR information of each packet granularity to the base station according to the feedback mode indication. Because the user equipment uses at least one spatial flow as a packet granularity to report the CSR information, the CSR information is more accurate, thereby improving properness of selecting, by the base station for a user, a spatial flow used to transmit data, and further improving utilization of system resources.

Figure 3:
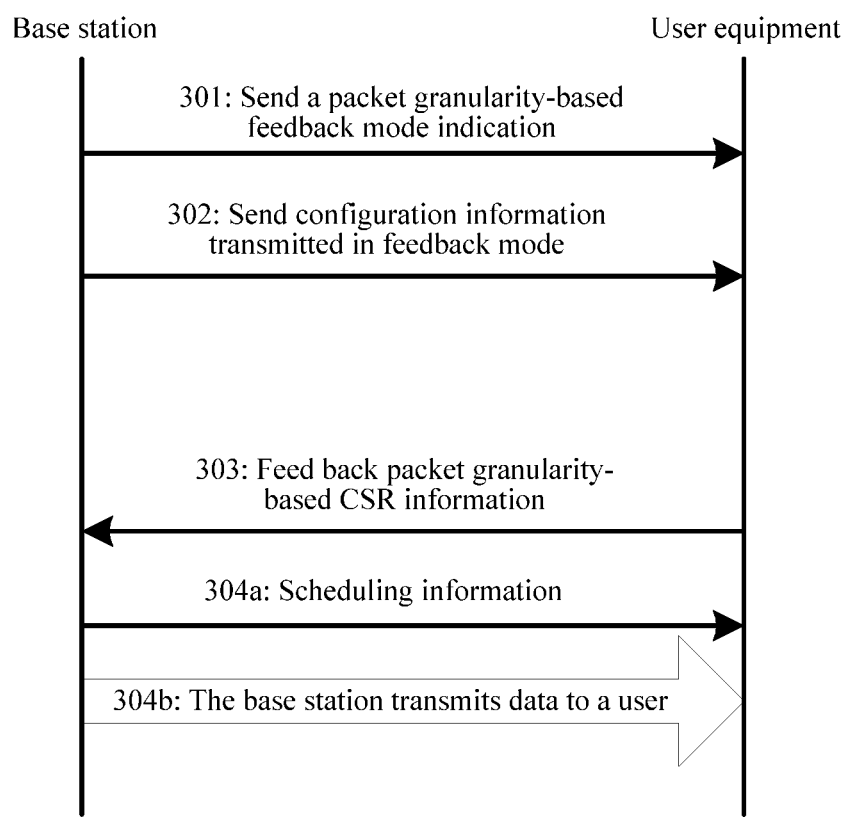
FIG. 3 is a flowchart of a spatial flow determining method according to still another embodiment.

FIG. 3 is a flowchart of a spatial flow determining method according to still another embodiment. As shown in FIG. 3, this embodiment provides a specific interaction process between a base station and user equipment, and a quantity of spatial flows included in a packet granularity is one. The method includes the following steps.

Step 301: A base station sends a packet granularity-based feedback mode indication to user equipment.

In an embodiment of the present invention, after measuring the channel quality information of each spatial flow according to the feedback mode indication and the configuration information, the user equipment analyzes the channel quality information of each spatial flow to obtain information about an average value of channel quality of spatial flows in each packet granularity, and information about a difference between the channel quality of each spatial flow and the average value, and then sends the information as the CSR information to the base station, so that the base station may directly determine, for the user equipment according to the information, a spatial flow used to transmit data.

In another embodiment, after measuring the channel quality information of each spatial flow according to the feedback mode indication and the configuration information, the user equipment sends the channel quality information as the CSR information to the base station, so that the base station obtains through analysis information about an average value of channel quality of spatial flows in each packet granularity, and information about a difference between the channel quality of each spatial flow and the average value according to the channel quality information, and then the base station determines, for the user equipment according to the information about the average value of the channel quality of the spatial flows in each packet granularity, and the information about the difference between the channel quality of each spatial flow and the average value that are obtained through analysis, a spatial flow used to transmit data.

Feedback manners of the CSR information of different packet granularities may be a periodic feedback manner or a non-periodic feedback manner, where the periodic feedback manner and the non-periodic feedback manner further include reporting an overall bandwidth, or selecting and reporting a best part of a bandwidth by the user equipment.

Step 203: The user equipment sends the CSR information of each packet granularity to the base station according to the feedback mode indication.

In an embodiment, after measuring the channel quality information of each spatial flow according to the feedback mode indication and the configuration information, the user equipment analyzes the channel quality information of each spatial flow to obtain information about an average value of channel quality of spatial flows in each packet granularity, and information about a difference between the channel quality of each spatial flow and the average value, and then sends the information as the CSR information to the base station.

In another embodiment, after measuring the channel quality information of each spatial flow according to the feedback mode indication and the configuration information, the user equipment sends the channel quality information as the CSR information to the base station.

In the spatial flow determining method provided by this embodiment, user equipment receives a feedback mode indication sent by a base station, where the feedback mode indication is used to instruct the user equipment to feed back, based on a packet granularity, channel state report CSR information, and each packet granularity includes at least one spatial flow, and then the user equipment measures channel quality information of each spatial flow, and obtains CSR information of each packet granularity according to the channel quality information, and finally sends the CSR information of each packet granularity to the base station according to the feedback mode indication. Because the user equipment uses at least one spatial flow as a packet granularity to report the CSR information, the CSR information is more accurate, thereby improving properness of selecting, by the base station for a user, a spatial flow used to transmit data, and further improving utilization of system resources.

FIG. 3 is a flowchart of a spatial flow determining method according to still another embodiment. As shown in FIG. 3, this embodiment provides a specific interaction process between a base station and user equipment, and a quantity of spatial flows included in a packet granularity is one. The method includes the following steps.

Step 301: A base station sends a packet granularity-based feedback mode indication to user equipment.

Optionally, the base station selects, according to the CSR information of each spatial flow, channels that are as mutually orthogonal as possible to transmit data for a user.

Step 304b: The base station transmits data to a user.

Specifically, after selecting the group of spatial flows with the best performance for a user, the base station uses these spatial flows to transmit user data.

In the spatial flow determining method provided by this embodiment, a base station sends, to user equipment, a packet granularity-based feedback mode indication and configuration information transmitted in feedback mode, the user equipment receives the feedback mode indication and the configuration information, measures channel quality information of each spatial flow, and feeds back the channel quality information to the base station, and the base station selects, according to fed back CSR information, a group of spatial flows with best performance to perform data transmission. Because a packet granularity includes one spatial flow, reported CSR information is more accurate, thereby ensuring properness of selecting, by the base station for a user, a spatial flow used to transmit data, and fully using system resources.

Figure 4:
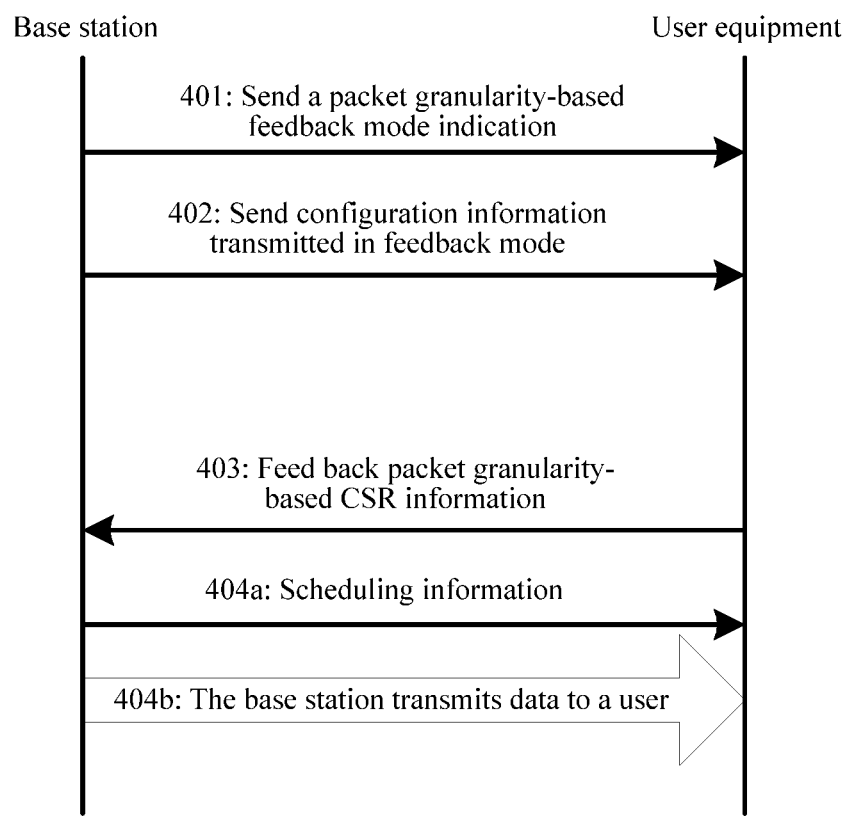
FIG. 4 is a flowchart of a spatial flow determining method according to yet another embodiment.

FIG. 4 is a flowchart of a spatial flow determining method according to yet another embodiment. As shown in FIG. 4, this embodiment provides a specific interaction process between a base station and user equipment, and a quantity of spatial flows included in a packet granularity is greater than or equal to two and is less than a quantity of spatial flows included in each code word. The method includes the following steps.

Step 401: A base station sends a packet granularity-based feedback mode indication to user equipment.

Specifically, the base station sends a packet granularity-based feedback mode indication to user equipment in a cell, to instruct the user equipment to feed back, in the unit of a packet granularity, channel state report CSR information.

Step 402: The base station sends, to the user equipment, configuration information transmitted in feedback mode.

Specifically, the base station sends configuration information in packet granularity-based feedback mode to the user equipment in the cell, where the configuration information includes: a quantity of spatial flows included in each packet granularity, a time-frequency resource occupied by the CSR information, and feedback manner information of CSR information of different packet granularities.

The quantity of spatial flows included in each packet granularity may be configured by the base station according to a real-time situation of a channel. When a transmission speed of the channel is stable and signal quality is relatively strong, the quantity of spatial flows included in each packet granularity may be as less as possible, that is, the CSR information sent to the base station is more accurate, for example, each packet granularity may include one spatial flow; however, when the transmission speed of the channel is not stable and the signal quality is relatively weak, the quantity of spatial flows included in each packet granularity may be appropriately increased, for example, each packet granularity may include two spatial flows or three spatial flows. However, the quantity of spatial flows included in each packet granularity is less than a quantity of spatial flows included in each code word.

The quantity of spatial flows included in each packet granularity may be configured by the base station according to a real-time situation of a channel. When a transmission speed of the channel is stable and signal quality is relatively strong, the quantity of spatial flows included in each packet granularity may be as less as possible, that is, the CSR information sent to the base station is more accurate, for example, each packet granularity may include one spatial flow; however, when the transmission speed of the channel is not stable and the signal quality is relatively weak, the quantity of spatial flows included in each packet granularity may be appropriately increased, for example, each packet granularity may include two spatial flows or three spatial flows. However, the quantity of spatial flows included in each packet granularity is less than a quantity of spatial flows included in each code word.

In this embodiment, each packet granularity includes one spatial flow.

Feedback manners of CSR information of different packet granularities may be a periodic feedback manner or a non-periodic feedback manner, where the periodic feedback manner and the non-periodic feedback manner further include reporting an overall bandwidth, or selecting and reporting a best part of a bandwidth by the user equipment.

Step 403: The user equipment feeds back packet granularity-based CSR information.

Specifically, after the user equipment in the cell receives the packet granularity-based feedback mode indication and the configuration information that are sent by the base station, the user equipment first collects channel quality information of each spatial flow and then analyzes the channel quality information of each spatial flow according to the feedback mode indication and the configuration information, to obtain information about an average value of channel quality of spatial flows in each packet granularity, and information about a difference between the channel quality of each spatial flow and the average value, and then sends CSR information to the base station, where the CSR information includes the information about the average value of the channel quality of the spatial flows in each packet granularity, and the information about the difference between the channel quality of each spatial flow and the average value.

Optionally, after the user equipment in the cell receives the packet granularity-based feedback mode indication and the configuration information that are sent by the base station, the user equipment first collects channel quality information of each spatial flow and then sends the channel quality information as CSR information to the base station, so that the base station obtains through analysis information about an average value of channel quality of spatial flows in each packet granularity, and information about a difference between the channel quality of each spatial flow and the average value according to the channel quality information, and then the base station determines, for the user equipment according to the information about the average value of the channel quality of the spatial flows in each packet granularity, and the information about the difference between the channel quality of each spatial flow and the average value that are obtained through analysis, a spatial flow used to transmit data.

Step 404a: The base station sends scheduling information.

Specifically, after receiving the information about the average value of the channel quality of the spatial flows in each packet granularity, and the information about the difference between the channel quality of each spatial flow and the average value that are sent by the user equipment, the base station predicts a data transmission speed of a spatial flow included in each packet granularity, and then calculates, according to the predicted data transmission speed and by comprehensively considering a performance requirement of a system, for example, balance between spatial flows for transmitting data to user equipments, performance weights of the spatial flows included in each packet granularity, so that a group of spatial flows with best performance are selected to perform data transmission, that is, a spatial flow with a maximum weight is selected to perform data transmission.

Optionally, when the CSR information uploaded by the user equipment and received by the base station includes the channel quality information of each spatial flow in each packet granularity, the base station obtains the information about the average value of the channel quality of the spatial flows, and the information about the difference between the channel quality of each spatial flow and the average value according to the channel quality information of each spatial flow in each packet granularity, predicts a data transmission speed of a spatial flow included in each packet granularity, and then calculates, according to the predicted data transmission speed and by comprehensively considering a performance requirement of a system, for example, balance between spatial flows for transmitting data to user equipments, performance weights of the spatial flows included in each packet granularity, so that a group of spatial flows with best performance are selected to perform data transmission, that is, a spatial flow with a maximum weight is selected to perform data transmission.

Optionally, the base station selects, according to the CSR information of each spatial flow in each packet granularity, channels that are as mutually orthogonal as possible to transmit data for a user.

Step 404b: The base station transmits data to a user.

Specifically, after selecting the group of spatial flows with the best performance for a user, the base station uses these spatial flows to transmit user data.

In the spatial flow determining method provided by this embodiment, a base station sends, to user equipment, a packet granularity-based feedback mode indication and configuration information transmitted in feedback mode, the user equipment receives the feedback mode indication and the configuration information, and feeds back CSR information of each packet granularity, and finally, the base station can determine, according to the CSR information of each packet granularity, a spatial flow used to transmit data to the user equipment. Because a quantity of spatial flows included in the packet granularity is less than a quantity of spatial flows included in a code word, the CSR information is more accurate, thereby improving properness of selecting, by the base station for a user, a spatial flow used to transmit data, and further improving utilization of system resources.

Figure 5:
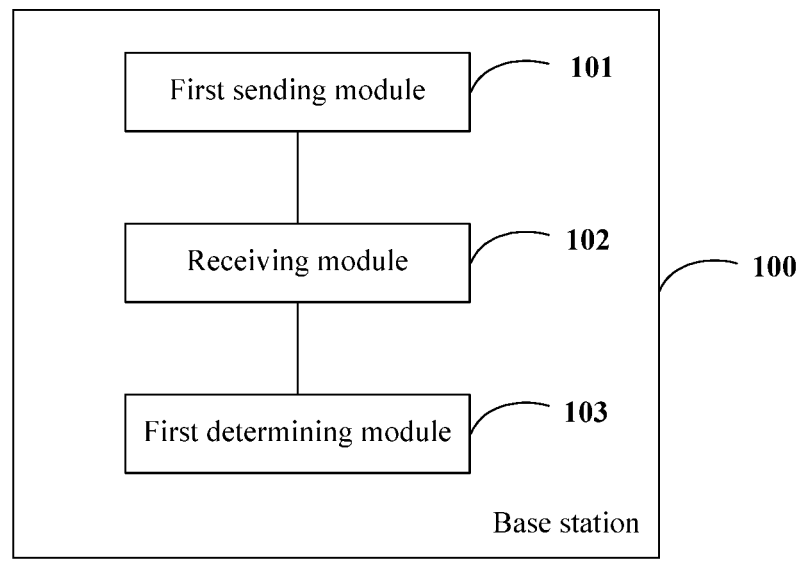
FIG. 5 is a schematic structural diagram of a base station according to an embodiment.

FIG. 5 is a schematic structural diagram of a base station according to an embodiment. As shown in FIG. 5, the base station 100 includes a first sending module 101, a receiving module 102, and a first determining module 103. The first sending module 101 is configured to send a feedback mode indication to user equipment, where the feedback mode indication is used to instruct the user equipment to feed back, based on a packet granularity, channel state report CSR information, and each packet granularity includes at least one spatial flow. The receiving module 102 is configured to receive CSR information of each packet granularity that is sent by the user equipment. The first determining module 103 is configured to determine, according to the CSR information of each packet granularity, a spatial flow used to transmit data to the user equipment.

Figure 6:
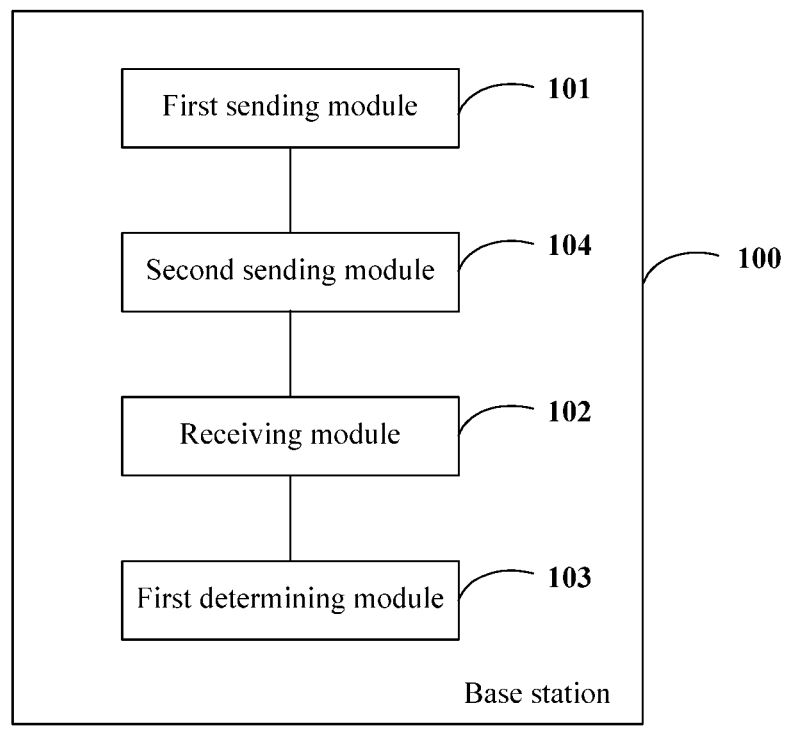
FIG. 6 is a schematic structural diagram of a base station according to another embodiment.

In addition, as shown in FIG. 6, the base station may further include a second sending module 104, configured to: before the receiving module 102 receives the CSR information of each packet granularity that is sent by the user equipment, send configuration information to the user equipment, where the configuration information includes at least one of the following parameters: a quantity of spatial flows included in each packet granularity, a time-frequency resource occupied by the CSR information, and feedback manner information of CSR information of different packet granularities.

Optionally, the CSR information of each packet granularity includes: information about an average value of channel quality of spatial flows in each packet granularity, and information about a difference between the channel quality of each spatial flow and the average value.

Figure 7:
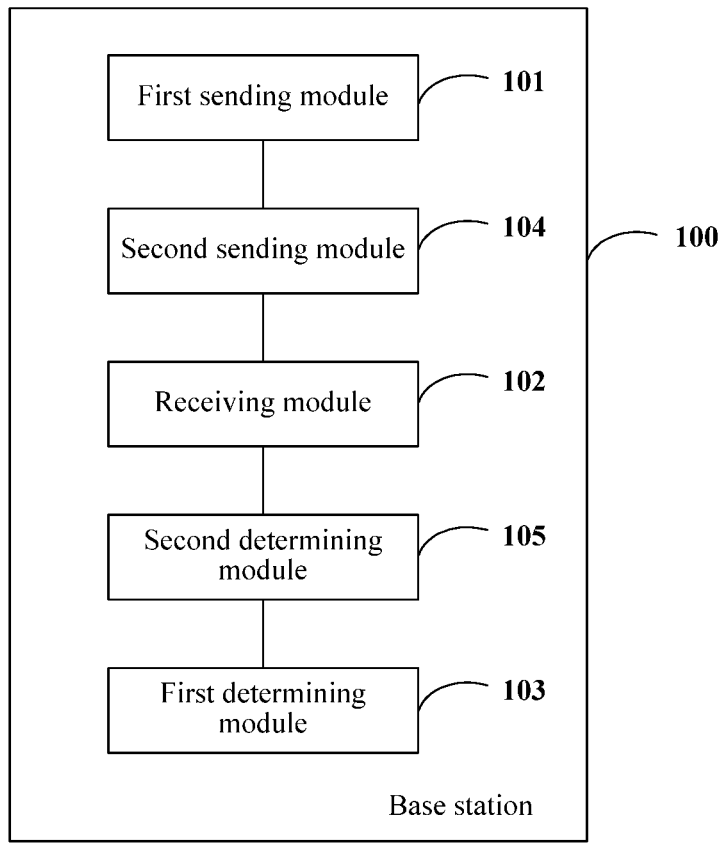
FIG. 7 is a schematic structural diagram of a base station according to still another embodiment.

Further, as shown in FIG. 7, the base station 100 may further include a second determining module 105. The CSR information of each packet granularity includes: channel quality information of each spatial flow in each packet granularity. The second determining module 105 is configured to: after the receiving module 102 receives the CSR information of each packet granularity that is sent by the user equipment, determine information about an average value of channel quality of spatial flows in each packet granularity, and information about a difference between the channel quality of each spatial flow and the average value according to the channel quality information of each spatial flow in each packet granularity.

Optionally, the quantity of spatial flows included in each packet granularity is less than a quantity of spatial flows included in each code word.

The base station provided by this embodiment is a device for performing the spatial flow determining method provided by Embodiment 1, and for a specific process of performing the spatial flow determining method by the base station, reference may be made to related descriptions in the method embodiment in FIG. 1, and details are not described herein again.

Figure 8:
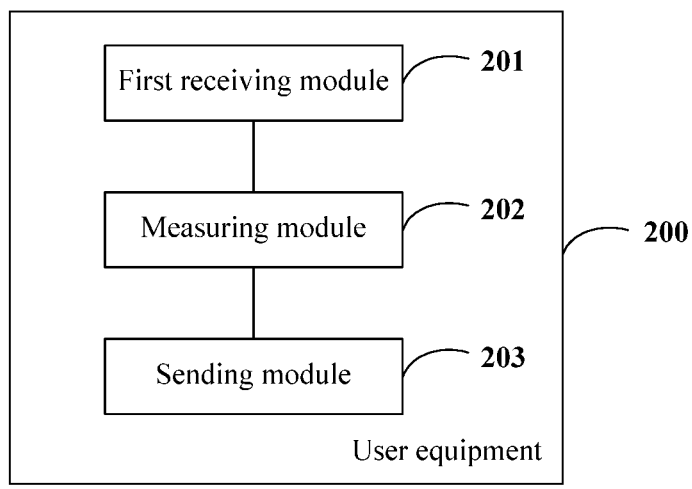
FIG. 8 is a schematic structural diagram of user equipment according to an embodiment.

FIG. 8 is a schematic structural diagram of user equipment according to an embodiment. As shown in FIG. 8, the user equipment 200 includes a first receiving module 201, a measuring module 202, and a sending module 203. The first receiving module 201 is configured to receive a feedback mode indication sent by a base station, where the feedback mode indication is used to instruct the user equipment to feed back, based on a packet granularity, channel state report CSR information, and each packet granularity includes at least one spatial flow. The measuring module 202 is configured to measure channel quality information of each spatial flow, and obtain CSR information of each packet granularity according to the channel quality information. The sending module 203 is configured to send the CSR information of each packet granularity to the base station according to the feedback mode indication received by the first receiving module 201.

Figure 9:
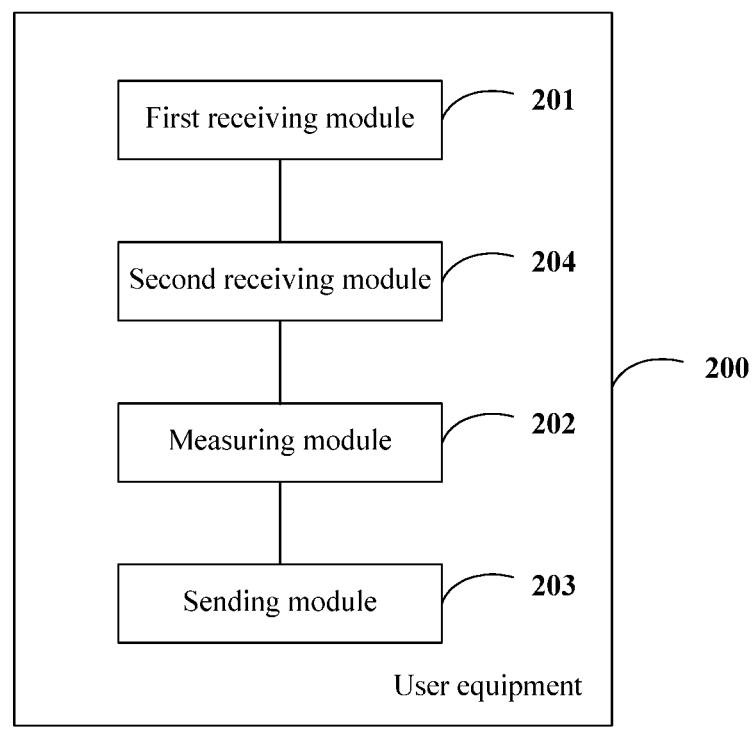
FIG. 9 is a schematic structural diagram of user equipment according to another embodiment.

In addition, as shown in FIG. 9, the user equipment 200 may further include a second receiving module 204, configured to: before the measuring module 202 measures the channel quality information of each spatial flow, receive configuration information sent by the base station, where the configuration information includes at least one of the following parameters: a quantity of spatial flows included in each packet granularity, a time-frequency resource occupied by the CSR information, and feedback manner information of CSR information of different packet granularities.

Optionally, the CSR information of each packet granularity includes: information about an average value of channel quality of spatial flows in each packet granularity, and information about a difference between the channel quality of each spatial flow and the average value; or the CSR information of each packet granularity includes: channel quality information of each spatial flow in each packet granularity.

Optionally, the quantity of spatial flows included in each packet granularity is less than a quantity of spatial flows included in each code word.

The user equipment provided by this embodiment is a device for performing the spatial flow determining method provided by Embodiment 2, and for a specific process of performing the spatial flow determining method by the user equipment, reference may be made to related descriptions in the method embodiment in FIG. 2, and details are not described herein again.

Figure 10:
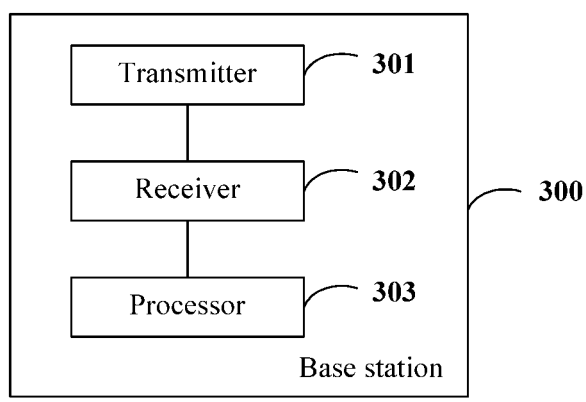
FIG. 10 is a schematic structural diagram of a base station according to yet another embodiment.

FIG. 10 is a schematic structural diagram of a base station according to yet another embodiment. As shown in FIG. 10, the base station 300 includes a transmitter 301, a receiver 302, and a processor 303. The transmitter 301 is configured to send a feedback mode indication to user equipment, where the feedback mode indication is used to instruct the user equipment to feed back, based on a packet granularity, channel state report CSR information, and each packet granularity includes at least one spatial flow. A receiver 302 is configured to receive CSR information of each packet granularity that is sent by the user equipment. The processor 303 is configured to determine, according to the CSR information of each packet granularity, a spatial flow used to transmit data to the user equipment.

Optionally, the transmitter 301 is further configured to: before the receiver 302 receives the CSR information of each packet granularity that is sent by the user equipment, send configuration information to the user equipment, where the configuration information includes at least one of the following parameters: a quantity of spatial flows included in each packet granularity, a time-frequency resource occupied by the CSR information, and feedback manner information of CSR information of different packet granularities.

Optionally, the CSR information of each packet granularity includes: information about an average value of channel quality of spatial flows in each packet granularity, and information about a difference between the channel quality of each spatial flow and the average value.

Optionally, the CSR information of each packet granularity includes: channel quality information of each spatial flow in each packet granularity.

The processor 303 is further configured to: after the receiver 302 receives the CSR information of each packet granularity that is sent by the user equipment, determine information about an average value of channel quality of spatial flows in each packet granularity, and information about a difference between the channel quality of each spatial flow and the average value according to the channel quality information of each spatial flow in each packet granularity.

Optionally, the quantity of spatial flows included in each packet granularity is less than a quantity of spatial flows included in each code word.

The base station provided by this embodiment is a device for performing the spatial flow determining method provided by Embodiment 1, and for a specific process of performing the spatial flow determining method by the base station, reference may be made to related descriptions in the method embodiment in FIG. 1, and details are not described herein again.

Figure 11:
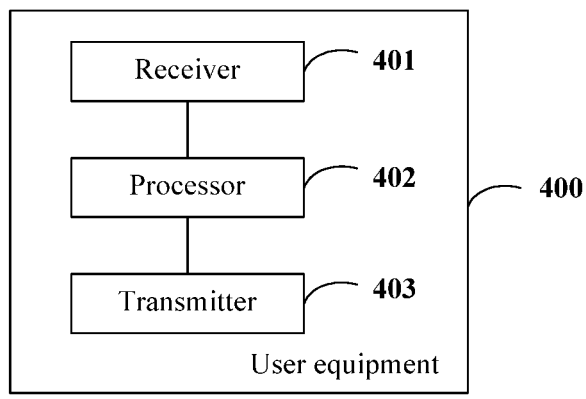
FIG. 11 is a schematic structural diagram of user equipment according to still another embodiment.

FIG. 11 is a schematic structural diagram of user equipment according to still another embodiment of the present invention. As shown in FIG. 11, the user equipment 400 includes a receiver 401, a processor 402, and a transmitter 403. The receiver 401 is configured to receive a feedback mode indication sent by a base station, where the feedback mode indication is used to instruct the user equipment to feed back, based on a packet granularity, channel state report CSR information, and each packet granularity includes at least one spatial flow. The processor 402 is configured to measure channel quality information of each spatial flow, and obtain CSR information of each packet granularity according to the channel quality information. The transmitter 403 is configured to send the CSR information of each packet granularity to the base station according to the feedback mode indication received by the receiver 401.

Optionally, the receiver 401 is further configured to: before the processor 402 measures the channel quality information of each spatial flow, receive configuration information sent by the base station, where the configuration information includes at least one of the following parameters: a quantity of spatial flows included in each packet granularity, a time-frequency resource occupied by the CSR information, and feedback manner information of CSR information of different packet granularities.

Optionally, the CSR information of each packet granularity includes: information about an average value of channel quality of spatial flows in each packet granularity, and information about a difference between the channel quality of each spatial flow and the average value; or the CSR information of each packet granularity includes: channel quality information of each spatial flow in each packet granularity.

Optionally, the quantity of spatial flows included in each packet granularity is less than a quantity of spatial flows included in each code word.

The user equipment provided by this embodiment is a device for performing the spatial flow determining method provided by Embodiment 2, and for a specific process of performing the spatial flow determining method by the user equipment, reference may be made to related descriptions in the method embodiment in FIG. 2, and details are not described herein again.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of embodiments of the present invention, but not for limiting embodiments of the present invention. Although embodiments of the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method, comprising:
sending, by a base station, a feedback mode indication to user equipment, wherein the feedback mode indication instructs the user equipment to feed back channel state report (CSR) information using a first group granularity of one or more group granularities, wherein each group granularity of the one or more group granularities comprises at least one spatial flow, a quantity of spatial flows comprised in each group granularity of the one or more group granularities is less than a quantity of spatial flows comprised in each code word used for transmission between the user equipment and the base station;
receiving, by the base station, the CSR information that is sent by the user equipment using the first group granularity, wherein the CSR information comprises a plurality of sets of CSR information, each set of the plurality of sets of CSR information has the first group granularity, and the CSR information that is sent using the first group granularity comprises channel quality information of each spatial flow comprised in the CSR information;
determining, by the base station for each set of the plurality of sets of CSR information, information about an average value of channel quality of spatial flows in the respective set, and information about a difference between the channel quality of each spatial flow in the respective set and the average value according to the channel quality information of each spatial flow in the respective set; and
determining, by the base station according to the CSR information, a first spatial flow for transmitting data to the user equipment.

2. The method according to claim 1, wherein before receiving the CSR information that is sent by the user equipment using the first group granularity, the method further comprises:
sending, by the base station, configuration information to the user equipment, wherein the configuration information comprises: a quantity of spatial flows comprised in each group granularity of the one or more group granularities.

3. The method according to claim 1, wherein before receiving the CSR information that is sent by the user equipment using the first group granularity, the method further comprises:
sending, by the base station, configuration information to the user equipment, wherein the configuration information comprises a time-frequency resource occupied by the CSR information.

4. The method according to claim 1, wherein before receiving the CSR information that is sent by the user equipment using the first group granularity, the method further comprises:
sending, by the base station, configuration information to the user equipment, wherein the configuration information comprises feedback manner information of different group granularities of the one or more group granularities.

5. A method, comprising:
receiving, by user equipment, a feedback mode indication sent by a base station, wherein the feedback mode indication instructs the user equipment to feed back channel state report (CSR) information using a first group granularity of one or more group granularities, wherein each group granularity of the one or more group granularities comprises at least one spatial flow, and a quantity of spatial flows comprised in each group granularity of the one or more group granularities is less than a quantity of spatial flows comprised in each code word used for transmission between the user equipment and the base station;
measuring, by the user equipment, channel quality information of each spatial flow used to transmit data between the user equipment and the base station, and obtaining the CSR information according to the channel quality information, wherein the CSR information comprises a plurality of sets of CSR information, each set of the plurality of sets of CSR information has the first group granularity, and wherein the CSR information that is sent using the first group granularity comprises the channel quality information of each spatial flow used to transmit data between the user equipment and the base station; and
sending, by the user equipment, the CSR information to the base station according to the feedback mode indication, wherein sending the CSR information to the base station causes the base station to determine, for each set of the plurality of sets of CSR information, information about an average value of channel quality of spatial flows in the respective set, and information about a difference between the channel quality of each spatial flow in the respective set and the average value according to the channel quality information of each spatial flow in the respective set.

6. The method according to claim 5, wherein before measuring the channel quality information of each spatial flow used to transmit data between the user equipment and the base station, the method further comprises:
receiving, by the user equipment, configuration information sent by the base station, wherein the configuration information comprises: a quantity of spatial flows comprised in each group granularity of the one or more group granularities.

7. The method according to claim 5, wherein before measuring the channel quality information of each spatial flow used to transmit data between the user equipment and the base station, the method further comprises:
receiving, by the user equipment, configuration information sent by the base station, wherein the configuration information comprises: a time-frequency resource occupied by the CSR information.

8. The method according to claim 5, wherein before measuring the channel quality information of each spatial flow used to transmit data between the user equipment and the base station, the method further comprises:
receiving, by the user equipment, configuration information sent by the base station, wherein the configuration information comprises feedback manner information of different group granularities of the one or more group granularities.

9. A base station, comprising:
a transmitter, configured to send a feedback mode indication to user equipment, wherein the feedback mode indication instructs the user equipment to feed back channel state report (CSR) information using a first group granularity of one or more group granularities, wherein each group granularity comprises at least one spatial flow, a quantity of spatial flows comprised in each group granularity of the one or more group granularities is less than a quantity of spatial flows comprised in each code word used for transmission between the user equipment and the base station, and wherein the CSR information that is sent using the first group granularity comprises channel quality information of each spatial flow comprised in the CSR information;
a receiver, configured to receive the CSR information that is sent by the user equipment using the first group granularity, wherein the CSR information comprises a plurality of sets of CSR information, and each set of the plurality of sets of CSR information has the first group granularity; and
a processor, configured to:
determine, for each set of the plurality of sets of CSR information, information about an average value of channel quality of spatial flows in the respective set, and information about a difference between the channel quality of each spatial flow in the respective set and the average value according to the channel quality information of each spatial flow in the respective set; and
determine, according to the CSR information, a first spatial flow for transmitting data to the user equipment.

10. The base station according to claim 9, wherein the transmitter is further configured to:
before the receiver receives the CSR information that is sent by the user equipment, send configuration information to the user equipment, wherein the configuration information comprises: a quantity of spatial flows comprised in each group granularity of the one or more group granularities.

11. The base station according to claim 9, wherein the transmitter is further configured to:
before the receiver receives the CSR information that is sent by the user equipment, send configuration information to the user equipment, wherein the configuration information comprises: a time-frequency resource occupied by the CSR information.

12. The base station according to claim 9, wherein the transmitter is further configured to:
before the receiver receives the CSR information that is sent by the user equipment, send configuration information to the user equipment, wherein the configuration information comprises: feedback manner information of different group granularities of the one or more group granularities.

13. User equipment, comprising:
a receiver, configured to receive a feedback mode indication sent by a base station, wherein the feedback mode indication instructs the user equipment to feed back channel state report (CSR) information using a first group granularity of one or more group granularities, wherein each group granularity of the one or more group granularities comprises at least one spatial flow, and a quantity of spatial flows comprised in each group granularity of the one or more group granularities is less than a quantity of spatial flows comprised in each code word used for transmission between the user equipment and the base station;
a processor, configured to measure channel quality information of each spatial flow used to transmit data between the user equipment and the base station, and obtain the CSR information according to the channel quality information, wherein the CSR information comprises a plurality of sets of CSR information, each set of the plurality of sets of CSR information has the first group granularity, and wherein the CSR information that is sent using the first group granularity comprises channel quality information of each spatial flow used to transmit data between the user equipment and the base station; and
a transmitter, configured to send the CSR information to the base station according to the feedback mode indication received by the receiver, wherein sending the CSR information to the base station causes the base station to determine, for each set of the plurality of sets of CSR information, information about an average value of channel quality of spatial flows in the respective set, and information about a difference between the channel quality of each spatial flow in the respective set and the average value according to the channel quality information of each spatial flow in the respective set.

14. The user equipment according to claim 13, wherein the receiver is further configured to:
before the processor measures the channel quality information of each spatial flow used to transmit data between the user equipment and the base station, receive configuration information sent by the base station, wherein the configuration information comprises: a quantity of spatial flows comprised in each group granularity of the one or more group granularities.

15. The user equipment according to claim 13, wherein the receiver is further configured to:
before the processor measures the channel quality information of each spatial flow used to transmit data between the user equipment and the base station, receive configuration information sent by the base station, wherein the configuration information comprises: a time-frequency resource occupied by the CSR information.

16. The user equipment according to claim 13, wherein the receiver is further configured to:
before the processor measures the channel quality information of each spatial flow used to transmit data between the user equipment and the base station, receive configuration information sent by the base station, wherein the configuration information comprises: feedback manner information of different group granularities of the one or more group granularities.

* * * * *